Patented Sept. 12, 1939

2,172,437

UNITED STATES PATENT OFFICE 2,172,437

PURIFICATION OF STILL RESIDUE

Frank W. Corkery, Crafton, Pa., assignor to Pennsylvania Industrial Chemical Corporation, a corporation of Pennsylvania No Drawing. Application April 30, 1938,
Serial No. 205,302

4 Claims. (Cl. 260—81)

This invention relates to a method of purifying still residue resulting from the purification and fractionation of light oil produced in the by-product coking of coal, and particularly to a method of purifying such still residue of its content of sulphonates.

Such light oil comes over in coal distillation, and is recovered from the gases with which it comes over by being absorbed in scrubbing oil which is ordinarily a heavy cut of petroleum. The still residue with which I deal results from fractionation and purifying treatment of this light oil, following its removal from the scrubbing oil. This still residue contains polymers of resin-forming bodies in various stages of polymerization, some heavy monomers, traces of naphthalene, and various percentages of sulphates and sulphonates. It is a dark viscous oily substance deficient in drying qualities, and itself possessing little utility in the arts. As it is commercially available, the still residue may be obtained from either of the following operations conducted upon the light oil.

One such source of still residue is the still in which the light oil is purified and fractionated to give crude benzol, crude toluol, No. 1 crude solvent naphtha (crude xylol), and No. 2 crude solvent naphtha. The residuum from this fractionation consists largely of heat polymers, and is know in the trade as "crude still" residue. The fractions from the crude still, after washing with sulphuric acid and neutralization, are distilled in what are known in the trade as "pure stills". The residues from the distillation of these fractions comprise primarily acid polymers and heat polymers, and comprise also sulphonates resultant from acid purification and alkaline neutralization of the light oil. The residues from the pure still contain also some compounds of the alkali and alkaline earths, including their sulphates resultant from neutralization following acid purification of the light oil. This pure still residue normally is mixed in a tank with the crude still residue, so that, as it is commercially available, still residue contains at least the residual products from these two types of still dealing with coke-oven light oil and its fractions. Usually there is also mixed in with these two still residues in the residue tank a third residue, which comprises bottoms from the distillation of the heavier cuts of No. 1 and No. 2 crude solvent naphtha. Usually the still residue is subjected to a distillation for the removal of solvents and naphthalene.

In purifying the still residue of its contained sulphonates, I have found the following to be particularly desirable procedure:

A low boiling aliphatic solvent, such as kerosene, v. m. p.; naphtha, Stoddard solvent, ligroin, or gasoline, desirably a petroleum distillate of the gravity and boiling point known as "mineral spirits", is run into a treating tank and is agitated, as by means of a mechanical agitator. The still residue is then run into the tank, and is agitated with the petroleum distillate until a precipitate forms. Desirably, in this step the volume of petroleum distillate is approximately twice the volume of the still residue.

Before the precipitate has a chance to coagulate, water is run in, and is agitated with the body of liquid in the tank. This liquid itself contains in solution the aromatic hydrocarbon and resinous contents of the still residue, and the introduction of water by wetting the precipitate prevents its agglomeration. During this stage of the operation the mixture in the treating tank is at normal room temperature, at slightly elevated temperature, or at a temperature somewhat below normal room temperature.

Either in the initial treating tank, or more efficiently after running it into a plurality of settling tanks, the treatment of the mixture is continued. If the mixture is transferred to a plurality of settling tanks, desirably the transfer is made with the introduction of live steam into the mixture, and with agitation; and steaming and agitation may be continued for a short period of time to insure completion of the sludge precipitation, and to prepare the mixture for stratification on settling. The dispersion of live steam through the mixture is desirable for the reason that it speeds up the rate of settling. If more time be allowed, the use of steam may be omitted.

Upon being allowed to settle stratification takes place in the mixture. The water content, which consists of the water initially added and that supplied by condensed steam if steam be used, floats the solution of still residue in petroleum distillate, to produce well defined stratification. In the water layer there is a settled mass of precipitate.

In the final stages of my process, the petroleum distillate solution of still residue is decanted to leave water and sludge in the tank, or tanks. Purified still residue is then recovered from solution in the petroleum solvent by distillation. In this step, the petroleum solvent is distilled over, and distillation may then be continued to any desired stage. Thus distillation may be continued as a topping step to distill off aromatic solvent and naphthalene only, to distill off these ingredients and also a portion of the oily "dipolymer oil" consisting chiefly of the dimers of coumarone and indene, or may be continued to a stage where solid coumarone-indene resin (substantially free of sulphonates) is residually recovered. I prefer to conduct any stage of this recovery step in which the still temperature exceeds 425° F. under steam and vacuum.

The sulphonates, which in stratification are in the water layer, may be recovered in accordance with the procedure described in my co-pending application Serial No. 131,182, filed March 16, 1937.

I claim as my invention:

1. The herein described method of purifying of its contained sulphonates a still residue resultant from the treatment and distillation of light oil derived from the by-product coking of coal and containing metallic sulphonates formed by acid purification and alkaline neutralization in the light oil prior to distillation, which consists in precipitating sulphonates from the still residue by agitating the still residue with low boiling aliphatic hydrocarbon, wetting the precipitate by agitating the mixture with water before the sulphonate precipitate coagulates, effecting stratification of the mixture and settling of the precipitate expedited by injection of live steam into the mixture to form a water layer containing the sulphonates and a hydrocarbon layer containing the other still residue ingredients in solution, separating the layer of still residue solution and the sulphonate-containing water layer, and by distillation recovering the still residue from solution.

2. The herein described method of recovering a relatively pure coumarone-type resin from a sulphonate-contaminated still residue resultant from the treatment and distillation of light oil derived in the by-product coking of coal and containing metallic sulphonates formed by acid purification and alkaline neutralization in the light oil prior to distillation, which consists in precipitating sulphonates from the still residue by agitating the still residue with low boiling aliphatic hydrocarbon, wetting the precipitate by agitating the mixture with water before the sulphonate precipitate coagulates, effecting stratification of the mixture and settling of the precipitate expedited by injection of live steam into the mixture to form a water layer containing the sulphonates and a hydrocarbon layer containing the other still residue ingredients in solution, separating the layer of still residue solution and the sulphonate-containing water layer, and by distillation to dryness recovering solid coumarone-type resin from the sulphonate-free still residue solution.

3. The herein described method of purifying of its contained sulphonates a still residue resultant from the treatment and distillation of light oil derived from the by-product coking of coal and containing metallic sulphonates formed by acid purification and alkaline neutralization in the light oil prior to distillation, which consists in precipitating sulphonates from the still residue by agitating the still residue with low boiling aliphatic hydrocarbon, agitating the mixture with water before the sulphonate precipitate coagulates, stratifying the mixture by settling to form a water layer containing the sulphonates and a hydrocarbon layer containing the other still residue ingredients in solution, separating the layer of still residue solution and the sulphonate-containing water layer, and by distillation recovering the still residue from solution.

4. The herein described method of recovering a relatively pure coumarone-type resin from a sulphonate-contaminated still residue resultant from the treatment and distillation of light oil derived in the by-product coking of coal and containing metallic sulphonates formed by acid purification and alkaline neutralization in the light oil prior to distillation, which consists in precipitating sulphonates from the still residue by agitating the still residue with low boiling aliphatic hydrocarbon, agitating the mixture with water before the sulphonate precipitate coagulates, stratifying the mixture by settling to form a water layer containing the sulphonates and a hydrocarbon layer containing the other still residue ingredients in solution, separating the layer of still residue solution and the sulphonate-containing water layer, and by distillation to dryness recovering solid coumarone-type resin from the sulphonate-free still residue solution.

FRANK W. CORKERY.